United States Patent [19]

Thompson

[11] Patent Number: 5,003,805
[45] Date of Patent: Apr. 2, 1991

[54] METHOD AND SYSTEM FOR MONITORING SHOT PEENING

[75] Inventor: Robert A. Thompson, Quaker Street, N.Y.

[73] Assignee: General Electric Company, Schenectady, N.Y.

[21] Appl. No.: 473,781

[22] Filed: Feb. 2, 1990

[51] Int. Cl.⁵ .............................................. B24C 1/10
[52] U.S. Cl. ........................................ 72/53; 51/415; 51/319
[58] Field of Search ........................ 51/415, 319, 324; 72/53, 37, 9, 10; 364/474.37, 472

[56] References Cited

U.S. PATENT DOCUMENTS

| | | | |
|---|---|---|---|
| 4,296,474 | 10/1981 | Hurt | 364/474.37 |
| 4,687,556 | 8/1987 | Sutton et al. | 72/53 |
| 4,805,429 | 2/1989 | Thompson | 72/53 |
| 4,873,855 | 10/1989 | Thompson | 72/53 |

Primary Examiner—Lowell A. Larson
Assistant Examiner—M. J. McKeon
Attorney, Agent, or Firm—John S. Beulick; James C. Davis, Jr.; Paul R. Webb, II

[57] ABSTRACT

A method and system for nondestructively measuring surface compression layer depth including obtaining profile data of a peened workpiece surface and determining a total plastic upset depth for a selected dent, the plastic upset depth being approximately equal to the dent diameter. The peening operations may then be adjusted, if needed, so that subsequent peening more closely conforms to predetermined, desired peening results.

18 Claims, 4 Drawing Sheets

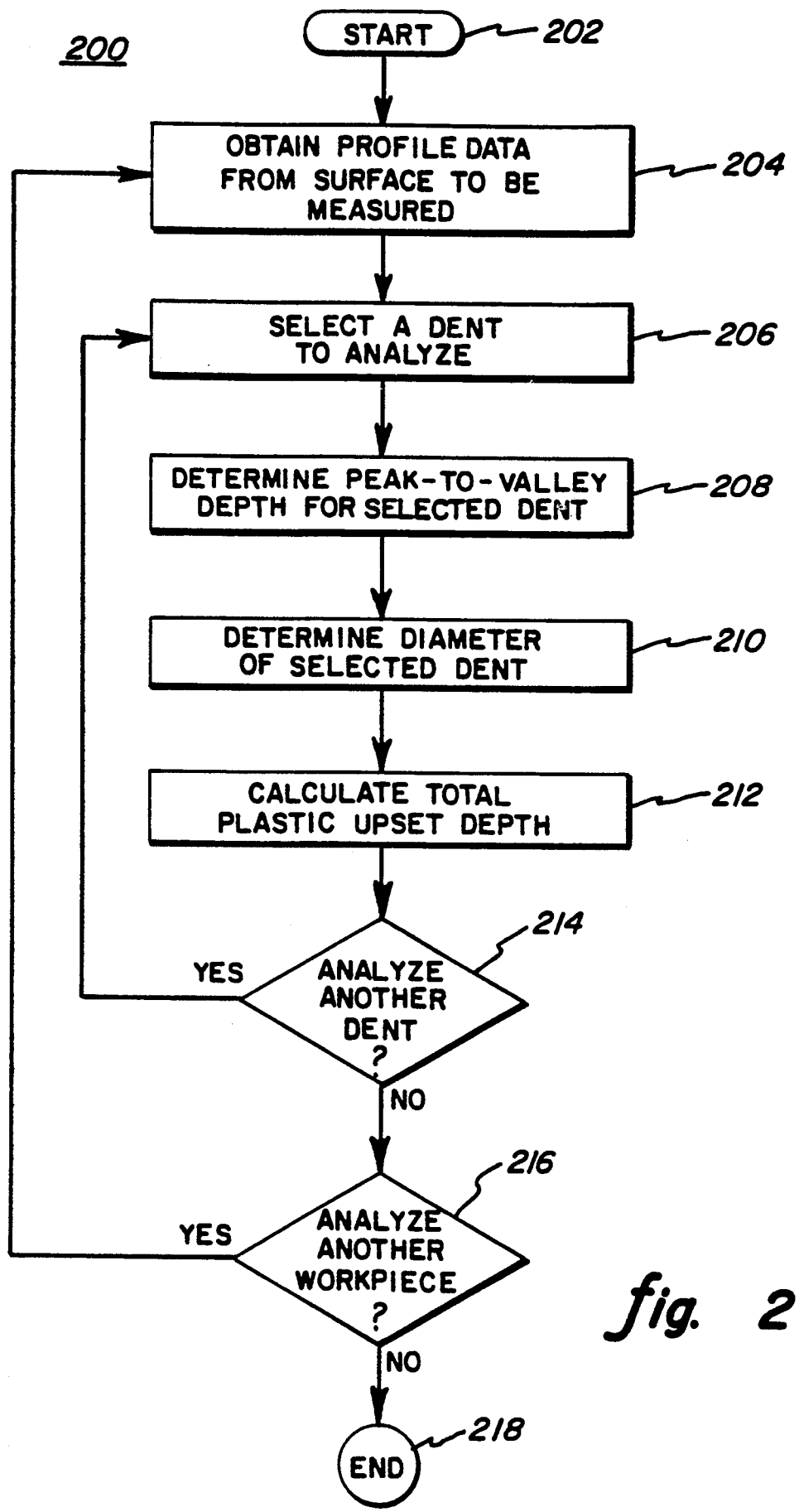

PEAK TO VALLEY = 1.017 mils

METHOD AND SYSTEM FOR MONITORING SHOT PEENING

The present invention relates to shot peening, and more specifically, to a method and system for nondestructively and directly measuring the surface compression layer depth resulting from a shot peening operation.

BACKGROUND OF THE INVENTION

During a shot peening process, a stream of shot (i.e., particles), travelling at a high velocity, is directed at a workpiece surface. The shot is directed at the workpiece so as to cause plastic deformation of the workpiece surface, which often is a metal surface. Although the process may be applied for other purposes, the shot peening process generally is used to increase fatigue strength of the workpiece.

For example, residual stress near the surface of high performance machine parts is directly related to fatigue life of the part. If the surface is in a state of residual compression, the growth of microcracks created by, for example, hard processing, will be inhibited. Shot peening is a very effective means for producing surface compression residual stress, and therefore, prolongs the useful life of the part.

Determining the state of surface compression due to shot peening, however, has proven to be very difficult. Until now, no nondestructive method is known for directly measuring the surface compression resulting from a shot peening operation. Specifically, the only known direct method for determining surface compression due to shot peening is to cut the part, and then physically measure the depth, i.e. thickness, of the surface compression. This direct method is time consuming and requires destructing the part being analyzed.

Another known method for determining surface compression due to shot peening generally is referred to as an indirect Almen method. In the Almen method, a strip of material is shot peened, and then the strip is analyzed to determine the surface compression due to the shot peening. The Almen method is indirect in that the effects of shot peening are not measured directly from a workpiece, rather a substitute Almen strip is utilized. The Almen strip method is subject to insensitivity due to process changes which may occur in the peening operations between Almen strip checks. Also, when peening workpieces having contoured surfaces, it is difficult to reproduce the peening conditions on the contour surfaces with a flat Almen strip. Further, variations in the Almen strips themselves render the Almen strip method subject to error.

It is therefore an object of the present invention to provide a nondestructive method and system for directly measuring surface compression due to a shot peening operation.

Another object of the present invention is to provide a method and system for measuring shot peening surface compression which facilitate continuously monitoring surface compression during a peening operation.

Still another object of the present invention is to provide a method and system for measuring shot peening surface compression which are continuous and sensitive to process changes during the peening process.

Still yet another object of the present invention is to provide a method and system for measuring shot peening surface compression which facilitates accurate measurement of surface compression on flat as well as contoured surfaces.

SUMMARY OF THE INVENTION

The present method and system for measuring surface compression due to a shot peening operation in a workpiece surface are nondestructive and direct. Specifically, data is gathered directly from the workpiece surface and in a manner which does not require destroying the workpiece.

In accordance with the present invention, a topogram for a surface which was shot peened is obtained. The topogram generally is in the form of an x-y plot generated by a profilometer scanning a line across the workpiece surface. From this data, a peak-to-valley depth of a selected indentation, sometimes referred to herein as a shot induced dent, is obtained. The diameter of the dent is also determined from the profile data. Using this information, a value for the total plastic upset depth below the surface can be determined. The total plastic upset depth is substantially equal to the depth of the surface compression layer.

Once the depth of the surface compression layer is determined, a system user may then adjust the shot peening apparatus if the peening operation is not producing the desired results. For example, if the surface compression layer is too shallow, the system user can adjust the peening apparatus so that the shot impacts the workpiece surface with greater force.

The present method and system provide that results from a shot peening operation can be determined in a nondestructive manner, and that the shot peening operation can be continuously monitored. Further, by nondestructively measuring the results of a shot peening operation on the actual workpiece, the peening operation can be accurately monitored when peening flat as well as contoured surfaces. Importantly, the present invention provides that the results of shot peening operations may be improved by facilitating improved control of the operations.

BRIEF DESCRIPTION OF THE DRAWINGS

These and other objects of the present invention, together with further features and advantages thereof, will be apparent from the following detailed specification when read together with the accompanying drawings, in which:

FIG. 2 is a flowchart illustrating a sequence of method steps in accordance with the present invention;

DETAILED DESCRIPTION OF THE INVENTION

Before discussing the specifics of a preferred embodiment of the present invention, it will be useful to discuss the physics of the shot peening process. When a workpiece surface is subject to plastic deformation under the shot peening process, the beneficial effect of the process depends upon the shot particle energy. The energy depends upon the product of the particle mass and velocity squared.

Newton's second law of motion provides that force is equal to the change in the amount of motion, the amount of motion being mass m times velocity v. The relationship may be stated as follows:

$$F = \frac{d}{dt}(mv) = m\frac{dv}{dt} + v\frac{dm}{dt}. \tag{1}$$

Typically, the above equation reduces to F=ma where a is acceleration. Acceleration is equal to the change in velocity during a period of time, and acceleration corresponds to the first term on the right side of Equation 1. In the case of a shot peening gun operating under steady state conditions, velocity does not change. Therefore, acceleration equals zero.

Accordingly, under stead state conditions, force F is equal to the velocity times mass differential. The application of Equation 1 to a shot stream may be thought of as somewhat analogous to withdrawing a rope from a box by pulling at a constant velocity. The first term of the equation is zero because the time differential of the velocity is zero. However, the second term of Equation 1 would be applicable in that the mass of rope in motion changes as the rope is pulled from the box.

In somewhat similar fashion, the change in the amount of motion of a stream of shot is its mass flow rate times its velocity. Thus, the velocity v of a stream of shot is equal to:

$$v = F/R, \tag{2}$$

wherein R is used to indicate the mass flow rate of shot and corresponds to dm/dt, and v is the average velocity of the shot stream From Equation 2 above, it will be seen that the average velocity of the shot stream may be calculated if the mass flow rate R and the force F of the shot stream can be calculated. The system described in Thompson, U.S. Pat. No. 4,805,429, titled "Shot Peening System and Method With Velocity Sensing", which is assigned to the present assignee, senses F by sensing the reaction force of the shot peening gun. This reaction force is equal and opposite in direction from the force of the shot and gases which are expelled from the shot peening gun. A flow controller, usually disposed adjacent a shot hopper, provides mass flow rate R.

Figure 1:
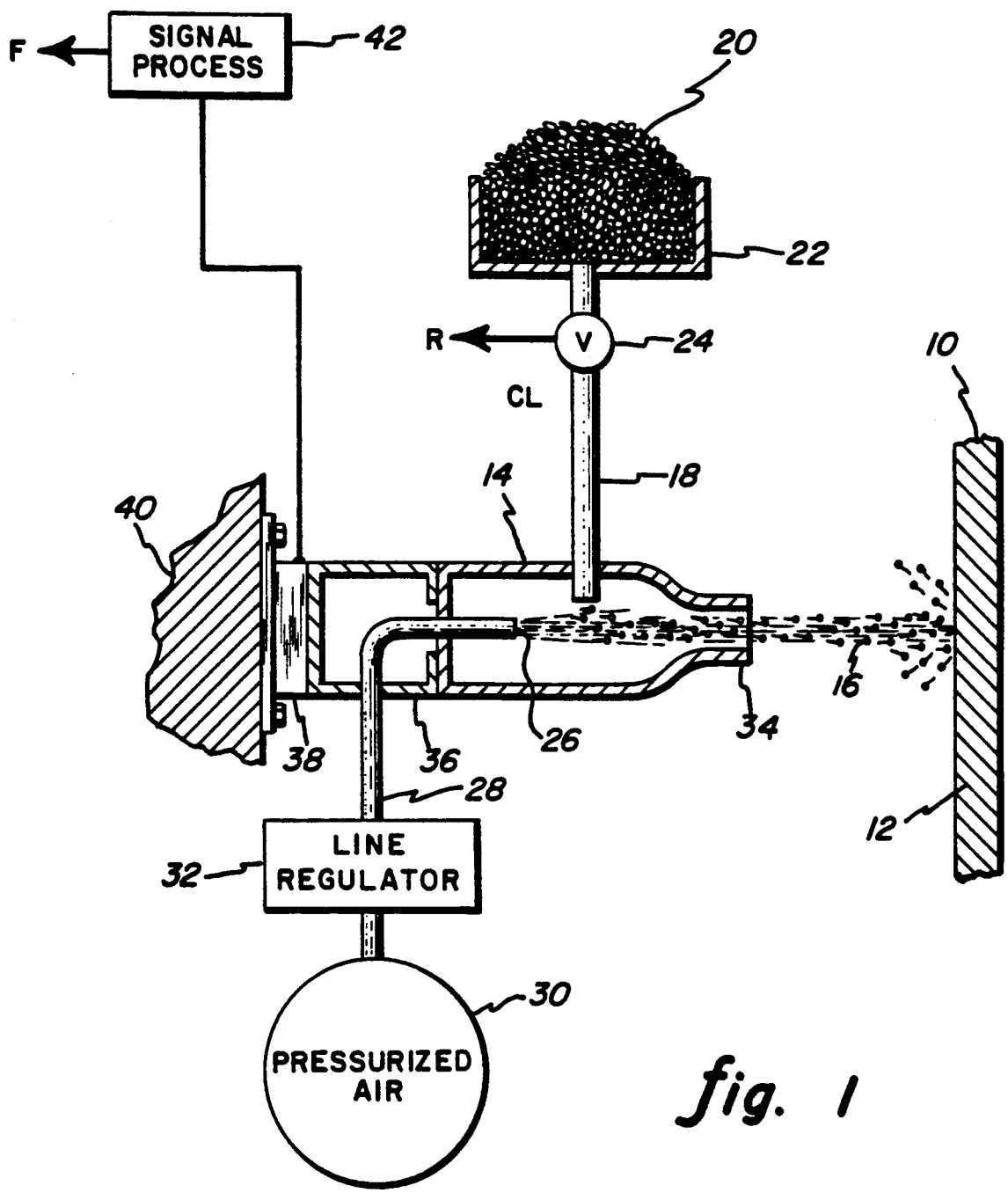
FIG. 1 shows a simplified schematic of a shot peening system.

FIG. 1 shows a shot peening operation. In particular, workpiece 10 has a surface 12 which is being subjected to shot peening from a shot peening gun 14. The shot peening gun 14 establishes a shot blast path 16 by expelling shot supplied to gun 14 through shot feedline 18 which carries shot 20 from hopper 22. The shot is supplied to feedline 18 by way of flow controller 24. The flow controller may be a common type of flow controller using an electromagnet to dispense metered amounts of metallic shot, although other types of flow controllers might be used. The flow controller 24 supplies a mass flow rate signal R in known fashion as shown through control line CL. Signal R represents the amount of shot which is supplied to the feedline 18 and, therefore, the amount of shot expelled by the gun 14 absent any blockage or other system malfunction.

The shot supplied to the gun 14 from feedline 18 is entrained in pressurized air from an air expansion nozzle 26 at the end of air supply conduit 28. The air supply conduit 28 provides pressurized air from pressured air source 30 by way of line regulator 32, which is used in known fashion to regulate and adjust the air pressure supplied to the gun 14. The pressure of the air supplied to the nozzle 26, among other factors, helps to determine the velocity of the shot expelled from the nozzle 34 and gun 14. The gun 14 is mounted to a bracket 36.

The components of FIG. 1 which are discussed above are relatively standard components. Shot peening gun 14 is a gravity type of shot peening gun. Other types of shot peening guns such as a suction lift gun or pressure pot gun may also be utilized.

In order to obtain the force magnitude data specified by Equation 2, gun 14 includes a bracket 36 which is mounted upon a force sensor 38. Force sensor 38 is disposed between gun 14 and mounting base 40 which supports gun 14. Force sensor 38 is preferably a directional strain guage which will detect forces parallel to the direction in which shot is ejected from gun 14. However, force sensor 38 will detect the reaction force of gun 14 as it ejects the shot in path 16. Force sensor 38 is connected to signal processing circuit 42 which supplies force signal F. Although other force sensors could be used, force sensor 38 may be a commercially available Lebow load cell Model 3397 and signal processing circuit 42 may be a corresponding transducer instrument 7530, these two components often being sold as a package. Signal processing circuit 42 basically converts the output from force sensor 38 into a form corresponding to pounds of force such that the output may be displayed and/or recorded.

As should be apparent from the above discussion, the velocity of a shot stream can be adjusted by adjusting the force at which the shot is expelled. The force at which the shot is expelled may be adjusted, for example, by decreasing or increasing the flow of air into the gun from pressured air source 30. Line regulator 32 may be utilized to achieve the force adjustment. The mass flow rate may be adjusted by adjusting the rate at which shot is expelled from hopper 22. Flow controller 24 may be utilized to make the mass flow rate adjustment.

Figure 3:
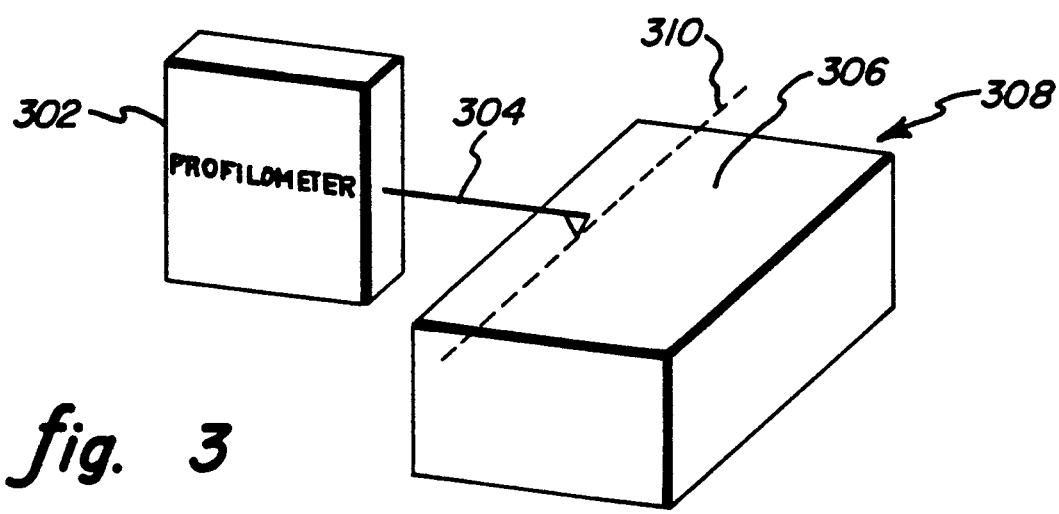
FIG. 3 illustrates, in block diagram, a profilometer operating to gather profile data from a workpiece.

To monitor a shot peening operation, and in accordance with the present invention, after a workpiece surface has been peened, a system user initiates the process illustrated as a flow diagram 200 in FIG. 2. The system user may, for example, be a human or a computer including a computer-controlled robotic unit. Specifically referring to flowchart 200, after the process has been initiated as indicated at a start block 202, the system user obtains an x-y profile of the workpiece surface to be measured as indicated at block 204. The profile may be obtained by using a profilometer such as a commercially available profilometer known as a Taylor Hobson "Form Talysurf", available from Rank Taylor Hobson, Limited (British Company). Other profilometers with suitable sensitivity could provide the necessary profile data. From the profile data, the system user then selects a dent to be analyzed as indicated at block 206. The process for selecting a best dent to analyze is explained here with reference to FIGS. 3 and 4. Specifically referring to FIG. 3, a profilometer 302 including a stylus 304 is shown as operating to gather profile data from a surface 306 of a workpiece 308. The stylus and/or workpiece is moved so that the stylus remains in contact with surface 306 along a selected line such as along a line 310. As the stylus moves along surface 306 on line 310, it records information regarding the surface geometry as an x-y plot.

Figure 4:
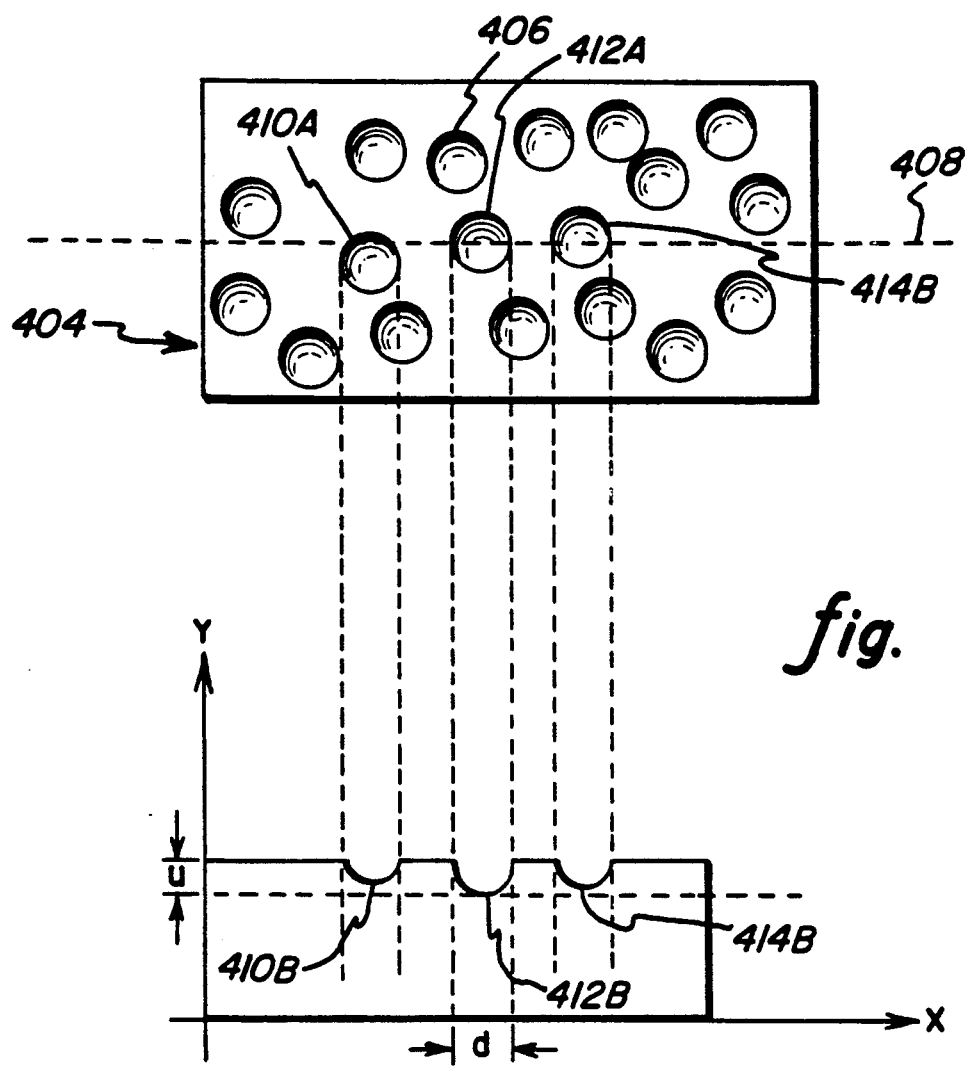
FIG. 4 illustrates a peened surface and corresponding ideal profile data which would be obtained from the surface.

An example of an ideal x-y plot 402 is shown in FIG. 4. The example shown in FIG. 4 is for illustrutuve purposes only, and normally, the entire surface of a workpiece would be peened until 100% of the surface has been struck at least once by a shot. Specifically referring again to FIG. 4, a workpiece 404 including a peened surface 406 is represented in x-y plot 402. The ideal profile data represented in x-y plot 402 is the data which would ideally be obtained by moving a stylus of a profilometer across the workpiece surface and along a line 408. As is apparant from FIG. 4, the stylus will not necessarily move through the center of each dent, and therefore, the data obtained for each dent will not be uniform. For example, for dent 410A, the stylus moves across only a small portion of the dent, and therefore, a corresponding curve 410B in the profile data only represents a portion of dent 410A. For dent 412A, however, the stylus moves through the center of the dent. A curve 412B represented in the profile data, therefore, represents a full diameter d and a full peak-to-valley depth u of dent 412A. As with dent 410A, only a portion of a dent 414A is represented as a curve 414B in the profile data.

From the above discussion, is should be apparent that in order to obtain the most accurate information regarding the results of a peening operation, the system user should select, from the profile data, a curve which apparently has the greatest diameter and/or peak-to-valley depth. In this manner, the system user can minimize errors which may occur due to the stylus of the profilometer not obtaining data by moving through the center of each dent.

Once a dent has been selected, the system user then determines a peak-to-valley depth of the user specified dent as indicated at block 208. For example, and referring to FIG. 5, a dent has been selected between dotted lines 6A—6A and 6B—6B. The peak-to-valley depth of the specified dent is 1.017 mils. This may be more apparent by viewing FIG. 6 which is an exploded view of the portion of the curve in FIG. 5 between lines 6A—6A and 6B—6B.

Figure 5:
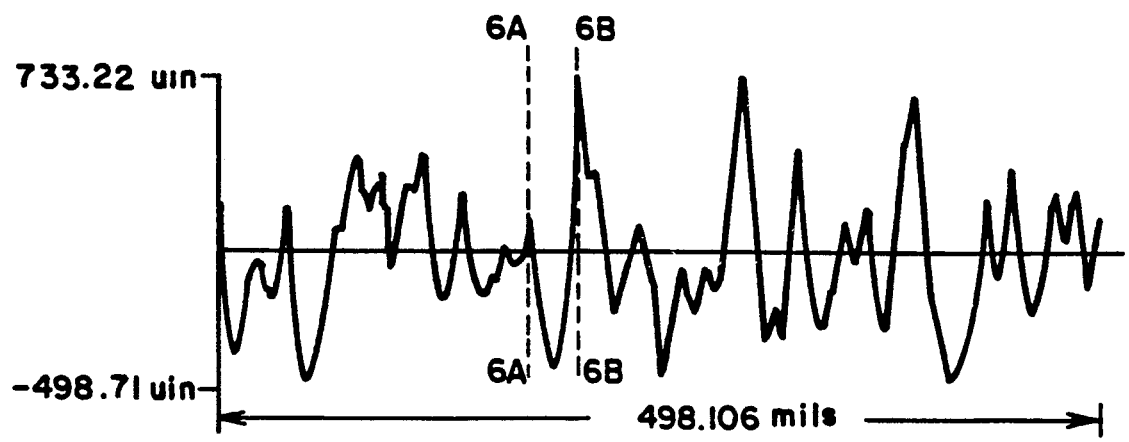
FIG. 5 is a topogram, obtained using a Rank Taylor Hobson, Limited (British Company) "Form Talysurf" profilometer, of a workpiece surface which has been peened.

The system user then determines the diameter of the selected dent as indicated in block 210. The diameter of the dent selected in FIG. 5 is 27.915 mils, as is apparent from FIG. 6.

Once the peak-to-valley depth and diameter are determined, the system user calculates the total plastic upset depth as indicated at block 212. Specifically, the following equation may be utilized to determine the depth of the surface compression layer:

$$U = d = 2(uD)^{\frac{1}{2}} \qquad (3)$$

wherein,
U = total plastic upset depth below the original surface;
u = dent depth below the original surface;
d = dimple diameter; and
D = effective shot diameter.

Figure 6:
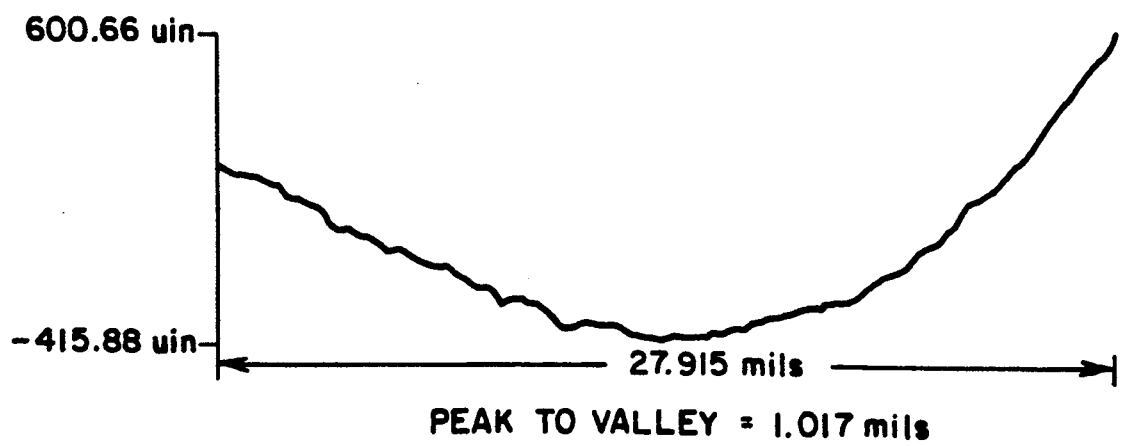
FIG. 6 is an expanded view of a portion of the topogram in FIG. 2 and between vertical dotted lines 6A—6A and 6B—6B in FIG. 5.

Using the relationship set forth in Equation 3, a shot particle having an effective diameter D equal to 191.6 mils would be required to produce the selected dent shown in FIG. 6. The diameter of the shot actually used in the peening operation represented in FIGS. 5 and 6 was 93.8 mils. Due to deformation of the shot upon impact, the effective diameter of the shot was about double its actual diameter. In accordance with Equation 3, the illustrated dent diameter would result in a plastic upset depth of:

$$U = d = 27.9 \text{ mils.} \qquad (4)$$

Since the total plastic upset depth below the surface is substantially equal to the depth of the surface compression layer, the depth of the surface compression layer also is approximately equal to 27.9 mils.

Once the surface compression layer depth is known, a system user may adjust the peening operation, if needed, so that the desired results are obtained. For example, adjusting the regulation of pressurized air will result in increasing/decreasing the surface compression layer depth. The specific adjustment, of course, depends upon how the desired depth differs from the actual depth.

Once the surface compression layer depth has been determined for the selected dent, and as indicated at a first decision block 214, the system user may select another dent from the same profile signal. In some situations, it may be desirable to analyze another dent from a same workpiece for verification and/or peening consistency purposes.

If, however, the system user does not want to analyze another dent from the same workpiece, the system user may select another workpiece as indicated by a second decision block 216. If another workpiece is to be analyzed, operations continue by returning to operations illustrated at block 204. If operations are not be to continued, then the operation stops as indicated at an end block 218.

From the foregoing discussion, it should be apparent that the present method and system provide that the results from a shot peening operation can be determined in a direct and nondestructive manner, and that shot peening results can be continuously monitored therefore eliminating insensitivity due to process changes. The present invention also provides that accurate results may be obtained for flat as well as contoured surfaces. Importantly, the present invention provides that the results of shot peening operations may be improved by facilitating more accurate control of the peening operations.

While the present invention has been described with respect to a specific embodiment, many modifications, variations, substitutions and equivalents will be apparent to workers in the art. Accordingly, it is intended that the invention be limited only by the spirit and scope of the appended claims.

What is claimed is:

1. A method for monitoring a peening operation, a system user having predetermined a desired total plastic upset depth for dents in the surface to be peened, said method comprising the steps of:
   (a) obtaining profile data of a workpiece surface which has been peened, said profile data being obtained in a nondestructive and direct manner;
   (b) selecting a dent to analyze;
   (c) calculating an actual total plastic upset depth for the selected dent; and
   (d) adjusting, if needed, the peening operation so that the actual total plastic upset depth of a subsequently formed dent will be more in conformance with the predetermined desired total plastic upset depth.

2. A method for monitoring peening operations in accordance with claim 1 wherein obtaining profile data comprises the steps of:
 scanning the workpiece surface with a profilometer; and
 representing the profile data as a function of location versus depth.

3. A method for monitoring peening operations in accordance with claim 1 wherein selecting a dent to analyze comprises the steps of:
 determining, from the profile data, a curve representing a dent having a largest diameter; and
 selecting the curve for further analysis.

4. A method for monitoring peening operations in accordance with claim 1 wherein selecting a dent to analyze comprises the steps of:
 determining, from the profile data, a curve representing a dent having a greatest peak-to-valley depth; and
 selecting the curve for further analysis.

5. A method for monitoring peening operations in accordance with claim 1 wherein calculating an actual total plastic upset depth comprises the steps of:
 determining a peak-to-valley depth for the selected dent; and
 determining a diameter of the selected dent.

6. A method for monitoring peening operations in accordance with claim 5 wherein calculating an actual total plastic upset depth further comprises the step of:
 calculating $$U = d = 2(uD)^{\frac{1}{2}}$$

where,
 U = total plastic upset depth,
 u = dent depth, peak-to-valley,
 d = dimple diameter, and
 D = effective shot diameter.

7. A method for monitoring peening operations in accordance with claim 1 further comprising the step of:
 selecting from the profile data another dent to analyze and repeating steps (c)–(d).

8. A method for monitoring peening operations in accordance with claim 1 further comprising the step of:
 obtaining another workpiece and repeating steps (a)–(d).

9. A method for monitoring peening operations in accordance with claim 1 wherein adjusting the peening operation comprises the step of:
 adjusting mass flow rate of shot.

10. A method for monitoring peening operations in accordance with claim 1 wherein adjusting the peening operations comprises the steps of:
 adjusting pressurized air flow.

11. An apparatus for monitoring a peening operation, a system user having predetermined a desired total plastic upset depth for dents in the surface to be peened, said apparatus comprising:
 (a) means for obtaining profile data of a workpiece surface which has been peened, said profile data being obtained in a nondestructive and direct manner;
 (b) means for selecting a dent to analyze;
 (c) means for calculating an actual total plastic upset depth for the selected dent; and
 (d) means for adjusting, if needed, the peening operation so that the actual total plastic upset depth of a subsequently formed dent will be more in conformance with the predetermined desired total plastic upset depth.

12. An apparatus for monitoring peening operations in accordance with claim 11 wherein said means for obtaining profile data comprises:
 means for scanning the workpiece surface with a profilometer; and
 means for representing the profile data as a function of location versus depth.

13. An apparatus for monitoring peening operations in accordance with claim 11 wherein said means selecting a dent to analyze comprise:
 means for determining, from the profile data, a curve representing a dent having a largest diameter; and
 means for selecting the curve for further analysis.

14. An apparatus for monitoring peening operations in accordance with claim 11 wherein said means for selecting a dent to analyze comprise:
 means for determining, from the profile data, a curve representing a dent having a greatest peak-to-valley depth; and
 means for selecting the curve for further analysis.

15. An apparatus for monitoring peening operations in accordance with claim 11 wherein said means for calculating an actual total plastic upset depth comprises:
 means for determining a peak-to-valley depth for the selected dent; and
 means for determining a diameter of the selected dent.

16. An apparatus for monitoring peening operations in accordance with claim 15 wherein said means for calculating an actual total plastic upset depth further comprises:
 means for calculating $$U = d = 2(uD)^{\frac{1}{2}}$$

where,
 U = total plastic upset depth,
 u = dent depth, peak-to-valley,
 d = dimple diameter, and
 D = effective shot diameter.

17. An apparatus for monitoring peening operations in accordance with claim 11 wherein said means for adjusting the peening operation comprises:
 means for adjusting mass flow rate of shot.

18. An apparatus for monitoring peening operations in accordance with claim 11 wherein said means for adjusting the peening operations comprises:
 means for adjusting pressurized air flow.

* * * * *